United States Patent
Sendonaris (10) Patent No.: US 9,392,410 B2
(45) Date of Patent: Jul. 12, 2016

(54) SYSTEMS AND METHODS PROVIDING TRANSMIT DIVERSITY TO COMBAT MULTIPATH EFFECTS IN POSITION ESTIMATION

(71) Applicant: NextNav, LLC, Sunnyvale, CA (US)

(72) Inventor: Andrew Sendonaris, Los Gatos, CA (US)

(73) Assignee: NextNav, LLC, Sunnyvale, CA (US)

( * ) Notice: Subject to any disclaimer, the term of this patent is extended or adjusted under 35 U.S.C. 154(b) by 0 days.

(21) Appl. No.: 14/207,360

(22) Filed: Mar. 12, 2014

(65) Prior Publication Data

US 2015/0281899 A1 Oct. 1, 2015

Related U.S. Application Data

(60) Provisional application No. 61/786,544, filed on Mar. 15, 2013.

(51) Int. Cl.
| | | |
|---|---|---|
| H04W 4/02 | (2009.01) | |
| H04W 24/00 | (2009.01) | |
| G01S 5/02 | (2010.01) | |
| G01S 5/10 | (2006.01) | |

(52) U.S. Cl.
CPC .............. *H04W 4/023* (2013.01); *G01S 5/0273* (2013.01); *G01S 5/10* (2013.01); *H04W 4/025* (2013.01)

(58) Field of Classification Search
CPC .......... H04M 1/7253; H04M 1/72572; H04W 4/023; H04W 8/005
USPC .............................................. 455/456.1–457
See application file for complete search history.

(56) References Cited

U.S. PATENT DOCUMENTS

| | | |
|---|---|---|
| 5,663,990 A | 9/1997 | Bolgiano |
| 2003/0054832 A1 | 3/2003 | Stein |
| 2004/0192330 A1 | 9/2004 | Gaal |
| 2011/0074632 A1 | 3/2011 | Yeo |
| 2011/0143683 A1* | 6/2011 | Sridhara et al. ............ 455/67.16 |
| 2013/0057436 A1* | 3/2013 | Krasner et al. ................ 342/464 |
| 2013/0169484 A1* | 7/2013 | Raghupathy et al. ......... 342/386 |
| 2013/0301539 A1* | 11/2013 | Aguirre et al. ................ 370/329 |

FOREIGN PATENT DOCUMENTS

WO 2008/017034 A2 2/2008

OTHER PUBLICATIONS

Form PCT/ISA/220, PCT/US2014/024988, "Notification of Transmittal of the International Search Report and the Written Opinion of the International Searching Authority, or the Declaration", 1 page; Form PCT/ISA/210, PCT/US2014/024988, "International Search Report", 4 pages; Form PCT/ISA/237, PCT/US2014/024988, "Written Opinion of the International Searching Authority", 5 pages.
U.S. Patent & Trademark Office, Office Action, U.S. Appl. No. 14/207,439, 14 pages, Mailing Date Oct. 1, 2015.
Applicant, Response to Non-Final Office Action, U.S. Appl. No. 14/207,439, 14 pages, filed Dec. 14, 2015.
U.S. Patent & Trademark Office, Office Action, U.S. Appl. No. 14/207,439, 20 pages, Mailing Date Mar. 10, 2016.

* cited by examiner

*Primary Examiner* — Kamran Afshar
*Assistant Examiner* — Ather Mohiuddin (57) ABSTRACT

Described are systems and methods for estimating a position of receiver using sets of two or more transmitters that share one or more common characteristics with each other. Features may relate to estimating the position of the receiver using signals that were each concurrently transmitted from a different transmitter in a set of co-located transmitters.

18 Claims, 6 Drawing Sheets

SYSTEMS AND METHODS PROVIDING TRANSMIT DIVERSITY TO COMBAT MULTIPATH EFFECTS IN POSITION ESTIMATION

CROSS REFERENCE TO RELATED APPLICATIONS

This application claims priority under 35 U.S.C. §119(e) to U.S. Provisional Patent Application Ser. No. 61/786,544, filed Mar. 15, 2013, entitled SYSTEMS AND METHODS PROVIDING TRANSMIT DIVERSITY TO COMBAT MULTIPATH EFFECTS IN POSITION ESTIMATION, the content of which is hereby incorporated by reference herein in its entirety for all purposes.

FIELD

Various embodiments relate to wireless communications, and more particularly, to networks, devices, methods and computer-readable media for estimating a position of receiver using sets of two or more transmitters that share one or more common characteristics with each other.

BACKGROUND

It is desirable to estimate the position (or "location") of persons and things in a geographic area with a reasonable degree of accuracy. Accurate estimations of a position can be used to speed up emergency response times, track business assets, and link a consumer to a nearby business. Various techniques are used to estimate the position of an object, including trilateration, which is the process of using geometry to estimate a location of an object using distances traveled by different signals that are received at a location of the object, where the signals are transmitted from geographically-distributed transmitters.

In many urban terrestrial positioning systems, a line-of-sight (LOS) signal path from a transmitter to a receiver is blocked by buildings and the like, leaving only reflected paths over which signals travel from the transmitter to the receiver. This leads to less accurate estimates of a receiver's position, especially if the reflected path is a few hundred meters longer than the LOS path. To make matters worse, processing times must be kept to a minimum in order to determine a location of the receiver within strict time periods set by the government, commercial entities, or the demands of consumers. Accordingly, there is a need for improved position estimation techniques.

SUMMARY

Certain embodiments of this disclosure relate generally to networks, devices, methods and computer-readable media for estimating a position of a receiver. Such networks, devices, methods and computer-readable media may receive ranging signals from two co-located transmitters, and then estimate the receiver's position based on a relationship between information extracted from the two ranging signals and information corresponding to the locations of the two co-located transmitters.

DESCRIPTION

Terms

It is understood that each term used herein is given its broadest meaning as understood by one of skill in the art. For illustrative purposes, examples of some terms are given below. These examples may pertain to different embodiments.

The terms "line-of-sight" or "LOS" may be used herein to denote the shortest distance between any two points in space (e.g., a transmitter and a receiver or an estimate of the receiver's position). These terms are often used to denote a signal that would reach a receiver after traveling along straight signal path between the transmitter and the receiver, assuming that there are no intervening blockages from objects between the transmitter and the receiver. Similarly, the terms "multipath" or "MP" may be used herein to denote other distances beyond the shortest distance. These terms are typically used to denote signals that would reach a receiver after traveling around objects disposed between the transmitter and a receiver. When a signal travels, that signal travels along a "path" or "signal path" between a transmitter and a receiver. The path may include one or more segments, and each segment is typically a LOS path between two objects. For example, a multipath signal that reflects off of objects on its way to a receiver would include at least a first segment between the transmitter and a building, another segment between two buildings, and a last segment between a building and the receiver.

If the time of transmission of a signal from a transmitter and the reception time of the signal are known, then the difference between those times multiplied by speed of light would provide an estimate of the distance traveled by that signal.

The terms "range" and "distance" may be used interchangeably in this disclosure. However, in some cases, "range" refers to the Euclidean distance between a transmitter and a receiver. Of course, due to multipath travel of a signal, a receiver may only be able to determine an estimated distance to a transmitter using the measured travel time of that signal, but the receiver may not be able to determine the true distance to that transmitter using data extracted from the multipath signals.

In most cases, where two signals originate from the same location and are later received by a receiver, transmission and reception times corresponding to a first signal that traveled along a shorter path produce a first range measurement that is closer to true range than a second range measurement corresponding to transmission and reception times of a second signal that traveled over a longer path.

The term "pseudorange" may include a measurement of range in which there is a (typically unknown) bias present, often due to an error in the clock of a receiver. Normally this same bias is present (i.e., common mode) in association with all received signals, and hence may often be estimated if enough signals are received. Other types of bias may also be present, such as small errors in transmission time from a transmitter, due, for example, to temperature effects on transmitter circuitry. The pseudorange may be measured in distance units or time units, since the two are related by the speed of light.

In this disclosure the term "time-of-arrival" may indicate the time, as read on a local clock, of a signal arriving at a receiver. It should also be noted that measurement of a signal's time-of-arrival may be made with reference to different features of a signal. For example, such a measurement may be a leading edge measurement (e.g., first time crossing a threshold), the location of the signal cross-correlation peak, an average of the location of multiple signal peaks, and the like. The specification herein is not dependent upon the particular method of measuring a time-of-arrival. When different signals are concurrently transmitted, a difference between the times-of-arrival of those signals primarily corresponds to a difference in travel time, and therefore a difference in distance traveled by each signal. Similarly, when the different signals were concurrently received, a difference between the times of transmission of those signals primarily corresponds to a difference in travel time, and therefore a difference in distance traveled by each signal. It should be noted that distortions of transmitted and received signals, due to transmitter and receiver imperfections, as well as due to multipath effects, may lead to small errors in the measurement of times-of-arrival at the receiver. This is why the above mentioned difference is not solely due to differences in distance or travel time.

The term "trilateration" may include processes by which ranging results for various transmitters (e.g., range estimates/measurements corresponding to signals) are combined to estimate a receiver's location. Trilateration usually involves assigning weights to ranging results from each transmitter. There may also be an individual adjustment made to ranging results from each transmitter to account for multipath effect, bias, transmitter location, or other errors. During trilateration, a set of candidate locations are considered, and a location that best fits the data is selected. Each candidate location is a triplet of the form (x,y,z), usually in an East, North and Up (ENU) coordinate system. It is noted that methodologies applied in relation to an individual candidate position may be applied to multiple candidate positions. By way of example, one algorithm for trilateration may be defined as follows:

$$F(x,y,z,t_b) = \min\{\text{sum}(w_k^* | p_k - r_k(x,y,z) - t_b|^p)\},$$

where $w_k$ is the weight of the $k^{th}$ transmitter, $p_k$ is the pseudorange of the $k^{th}$ transmitter, $r_k(x,y,z)$ is the distance of the candidate location (x,y,z) to the $k^{th}$ transmitter, $t_b$ is the time bias (expressed in distance units), p is the power to which we raise the error (p is usually 2 in the literature; in an embodiment, p is 1, due to superior performance in the presence of multipath), and z is the receiver height.

BACKGROUND

Figure 1:
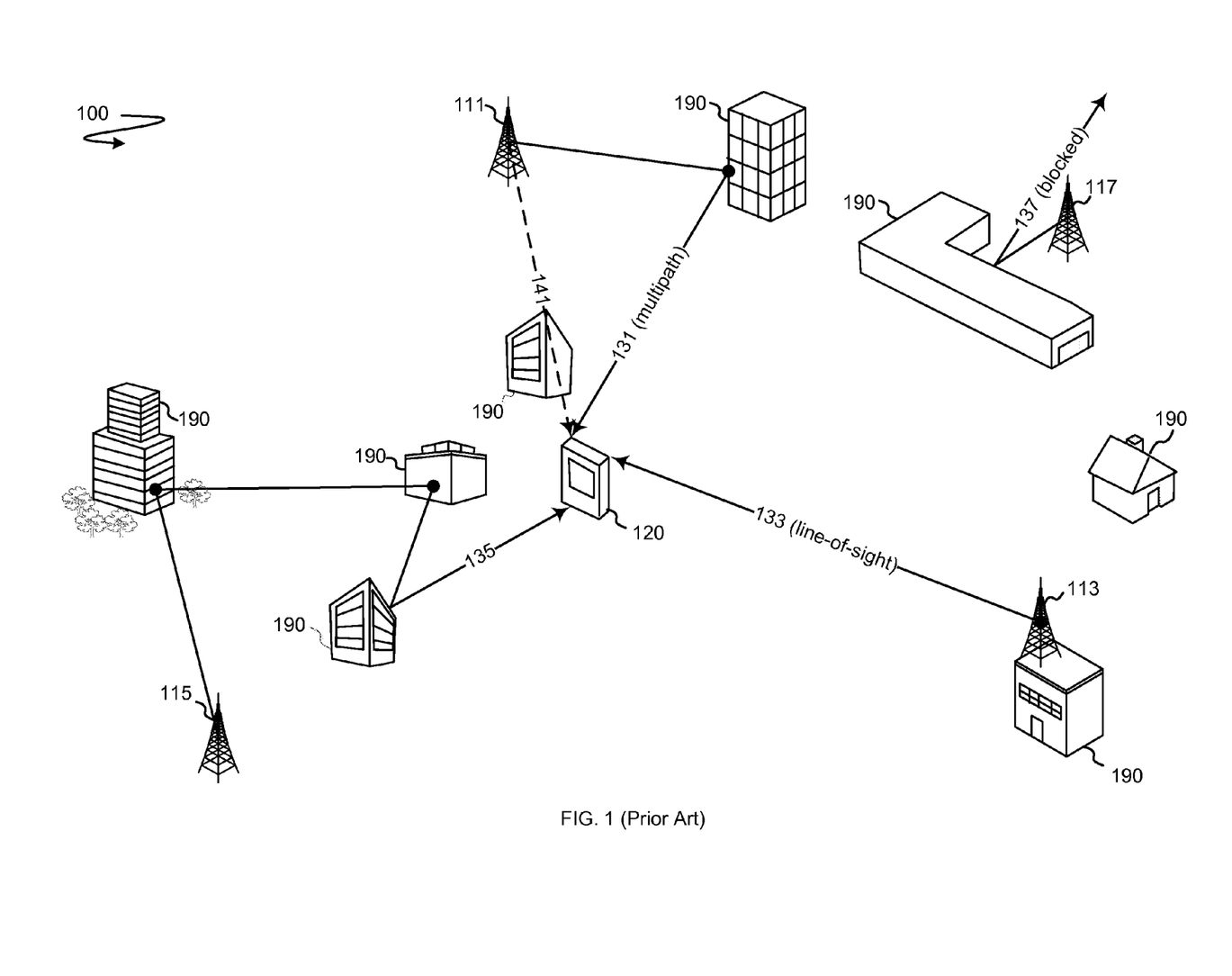
FIG. 1 depicts aspects of a typical terrestrial positioning system.
Figure 2:
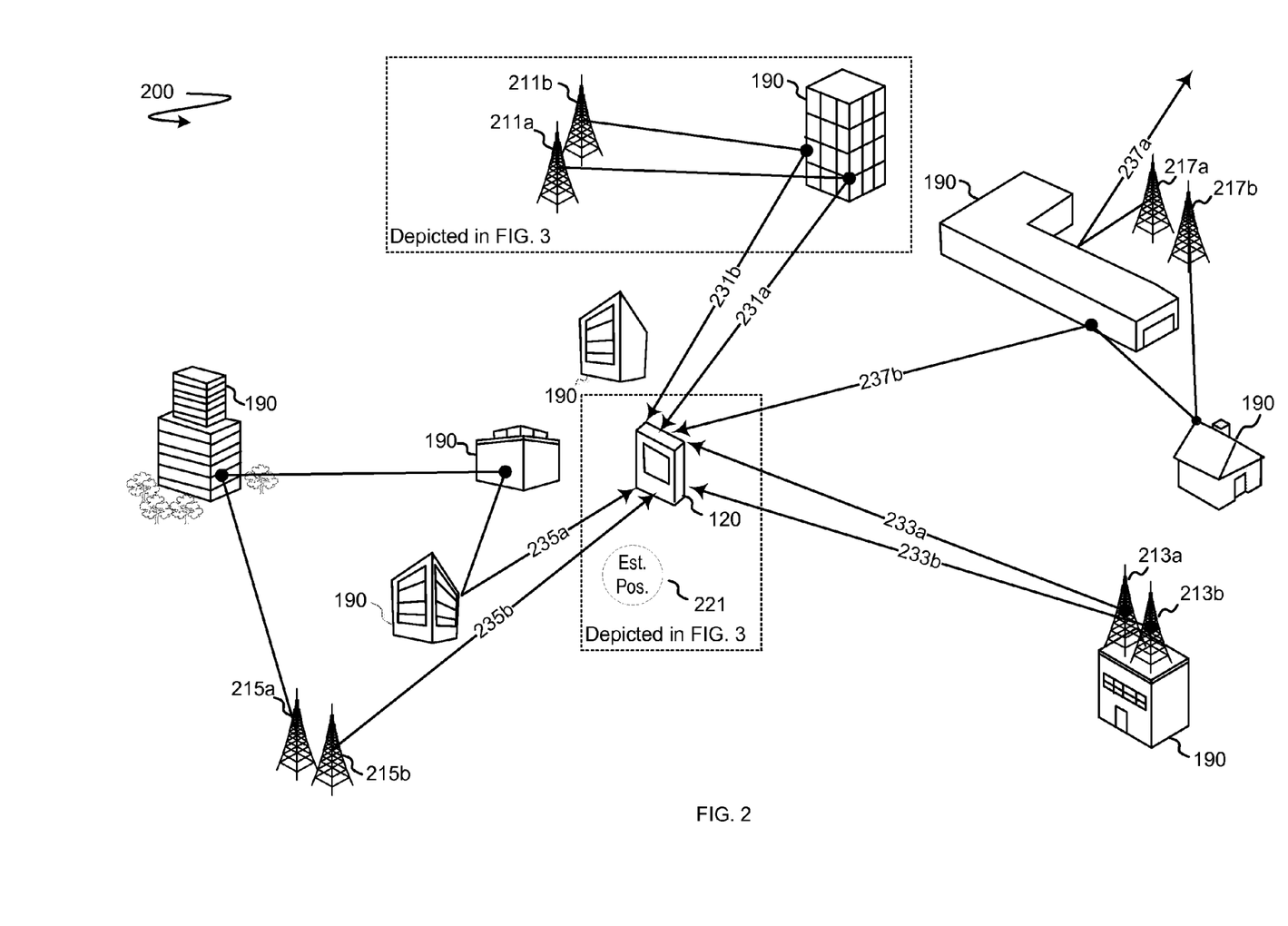
FIG. 2 depicts aspects of a system with sets of co-located transmitters.

FIG. 1 illustrates a typical ground-based positioning system 100 that includes terrestrial transmitters 111, 113, 115 and 117, each of which is located among various environmental objects 190. Such systems encounter various challenges in urban or indoor environments. One particular challenge relates to a "multipath" effect on signals that are received by receiver 120. Ideally, a signal transmitted by a transmitter would travel over the shortest distance separating the receiver and that transmitter. Such a signal is illustrated by signal 133, and is referred to as a "line-of-sight" (LOS) signal. In urban environments, however, many signals are reflected, diffracted and/or scattered by any number of objects before arriving at the receiver. These signals are illustrated by signals 131 and 135, and are referred to as "multipath" signals because they reach the receiver after traveling along multiple segments corresponding to difference reflections. Signal 137, by illustration, represents a blocked signal that never reaches receiver 120. It should be noted that the various LOS and multipath signals in FIG. 1 and FIG. 2 are shown are shown for exemplary purposes only. Many other multipath signal paths may exist in such environments and the paths shown may not be the most predominant ones possible in an actual environment.

Measurements of the travel time for a signal between a transmitter and a receiver may be used as a measure for the distance over which the signal traveled, but that distance is not always an accurate measurement of the shortest distance (or "range") between the transmitter and the receiver when the signal is a multipath signal. To illustrate this, FIG. 1 shows LOS distance 141 that is shorter than the path distance traveled by signal 131. Unfortunately, the multipath signal 131 produces an inaccurate measurement of the distance between the transmitter and the receiver that, if used during trilateration processing, will impair the precision of any estimated position of the receiver. In extreme situations, such as in dense urban canyon or deep indoor locations, the signal is totally attenuated by the objects between the transmitter and the receiver so that it is impossible to obtain an accurate LOS distance measurement by investigating the received signal delay profile alone. In some cases, reflected paths due to the multipath effect may be a few hundred meters longer than the LOS distance.

Additional complications are encountered with signals that travel over both LOS paths and multipath paths, making it more difficult for the receiver to retrieve the earliest arriving LOS signal, as well as estimate the transmission time associated with the signal. This directly causes a range measurement error. As a result, the calculated trilateration positioning solution is erroneous as well.

When a receiver receives a combination of both LOS and multipath signals from a given transmitter, the receiver may be able to extract the LOS signal component, in which case the signal may be considered an LOS signal from the standpoint of position location. Alternatively, when the presence of the multipath component is so predominant that it measurably alters the time-of-arrival measurement, the signal may be considered a multipath signal.

Multipath associated problems can be combated at several levels. For example, transmitters can be placed at higher altitudes to increase the likelihood of LOS signal reception. Alternatively, super-resolution, trilateration or other algorithms may be modified to increase likelihood of seeing a LOS signal or to better handle multipath signals. However, improvements to algorithms may not sufficiently address these problems, and deployment of higher-altitude transmitters may not be feasible.

One solution to these and other problems is described in more detail below.

Co-Located Transmitters

In order to address the problems described above, sets of two or more "co-located" transmitters may be installed at various locations as illustrated by system 200 in FIG. 2. In some embodiments, these locations may be approximately the same locations as the transmitters shown in FIG. 1.

Each set of "co-located" transmitters may consist of two or more transmitters that are separated by relatively short distances—e.g., no more than 5 meters in some embodiments, no more than 100 meters in some embodiments, or a multiple of the wavelength $\lambda$, of the carrier frequency used for transmission of the ranging signals (e.g., 15 times $\lambda$) in other embodiments. In some embodiments, the distance that separates co-located transmitters may be a function of the distances that separate each set of co-located transmitters. For example, the maximum distance between any two co-located transmitters may be a fraction of the shortest distance between any two sets of co-located transmitters (e.g., less than 1/10). Co-located transmitters may be identified using identifiers extracted from signals transmitted by each co-located transmitter.

It is noted that the co-located transmitters may form part of different platforms (e.g., each forming part of a different base station), or co-located transmitters may both form part of a single platform capable of supporting multiple co-located transmitters (e.g., each form a part of the same base station). In one embodiment, the co-located transmitters may use one or more common multiplexing parameters (e.g. time slot, pseudorandom sequence, or frequency offset). In other embodiments, different multiplexing parameters may be used for the co-located transmitters. In TDMA-based systems, it is preferable to have the co-located transmitters share the same time slot, in order to remove any alignment uncertainties due to receiver clock bias. That is, it makes it easier for the receiver to align and process the signals from co-located transmitters if they share a time slot. In this case, it may be necessary to reduce cross-correlation between the co-located transmitters that share a time slot as much as possible using the signal dimensions available to the system. One approach may be to assign different PRN codes and different frequency offsets to each transmitter.

Signals from each co-located transmitter may be transmitted, and information extracted from those signals after arriving at a receiver may be used to detect whether either signal or both signals are LOS signal(s) or multipath (MP) signal(s). LOS signals may be weighted more than MP signals during trilateration processing. Or, MP signals may be removed from trilateration computation. In some embodiments, a length of a MP signal path corresponding to one co-located transmitter may be estimated, and that length may then be modified (e.g., reduced) based on a shorter estimated length corresponding to a signal transmitted by another co-located transmitter. The modified length may be used during trilateration computation, thus improving performance.

As shown in FIG. 2, system 200 includes sets of co-located transmitters, including: co-located transmitters 211a, 211b; co-located transmitters 213a, 213b; co-located transmitters 215a, 215b; and co-located transmitters 217a, 217b. Each set is depicted as including two transmitters. However, any number of transmitters may be included in a set. Each transmitter transmits a signal that travels along a signal path. The signals include: signals 231a, 231b; 233a, 233b; 235a, 235b; and 237a, 237b. By way of illustration, some signals travel along line-of-sight (LOS) paths before reaching receiver 120, including signals 233a, 233b and 235b. Other signals travel along multipath signal paths before reaching receiver 120, including signals 231a, 231b, 235a and 237b. Still, other signals never reach receiver 120, including signal 237a.

For purposes of illustration, FIG. 2 further shows a location of an estimated position 221 of the receiver 120. The estimated position 221 may be based on range measurements corresponding to different ranging signals received from each set of co-located transmitters at the actual position of the receiver 120. As shown, the estimated position 221 and the actual location of the receiver 120 do not overlap, which is often the case when the estimated position 221 is based on multipath signals instead of LOS signals.

FIG. 2 illustrates that using co-located transmitters may have various advantages. In certain embodiments, a LOS signal may be received from one of the co-located transmitters when only a multipath signal is received from the other co-located transmitter (e.g., compare signal 235b from transmitter 215b with signal 235a from transmitter 215a).

In certain embodiments, a signal may be received from one of the co-located transmitters when no signal is received from the other co-located transmitter (e.g., compare signal 237b from transmitter 217b with signal 237a from transmitter 217a).

In other embodiments, two or more multipath signals may be received from the co-located transmitters (e.g., signal 231a from transmitter 211a, and signal 231b from transmitter 211b). Such signals may individually travel along different paths of different distances. In some cases, the difference in these distances may be significant such that using a range measurement based on one of the multipath signals while not using a range measurement based on the other multipath signal results in a more precise estimate of position as compared to using both range measurements. Thus, by receiving multiple signals from multiple co-located transmitters, receiver 120 may determine which information extracted from the signals is more accurate.

In some embodiments, as described in further detail below, a time-of-arrival or range measurement corresponding to a signal received from a first co-located transmitter may be weighted or adjusted (e.g., for use during trilateration processing) based on the location of this first transmitter with respect to the location of another co-located transmitter that transmitted another signal. In one embodiment, the weight or adjustment may be determined by relating distances traveled by the signals to the line-of-sight distances between an assumed position of the receiver and the positions of the co-located transmitters. For example, for a particular assumed receiver position and known transmitter positions, the LOS distance from two co-located transmitters may be computed to be 50 and 100 meters, respectively. In this example, the extra 50 meters of the LOS distance of the latter transmitter may be used as an adjustment of the path distance of one of the received signals. Of course, such an adjustment may be in error, especially in a heavy multipath environment. Similar weights or adjustments may be made to other times-of-arrival corresponding to signals from other co-located transmitters that are similarly close to each other.

However, one consequence of determining weights or adjustments based on the locations of the transmitters with respect to an assumed position of the receiver is that different hypothesized receiver locations would typically require different weights or adjustments based on different line-of-sight distances corresponding to each hypothesized receiver location, thus leading to more computational complexity. This can be avoided by not considering the line-of-sight distances, at the cost of slight additional error in assessing multipath induced delays. For example, the weights or adjustments may be determined by relating the distances traveled by the signals with a distance separating the two transmitters, or simply by relating the distances traveled by the signals to each other given that they were transmitted from generally the same location. Hence, there is a natural complexity versus cost tradeoff. The discussion and methodologies described herein, apply to each of these approaches.

Figure 3:
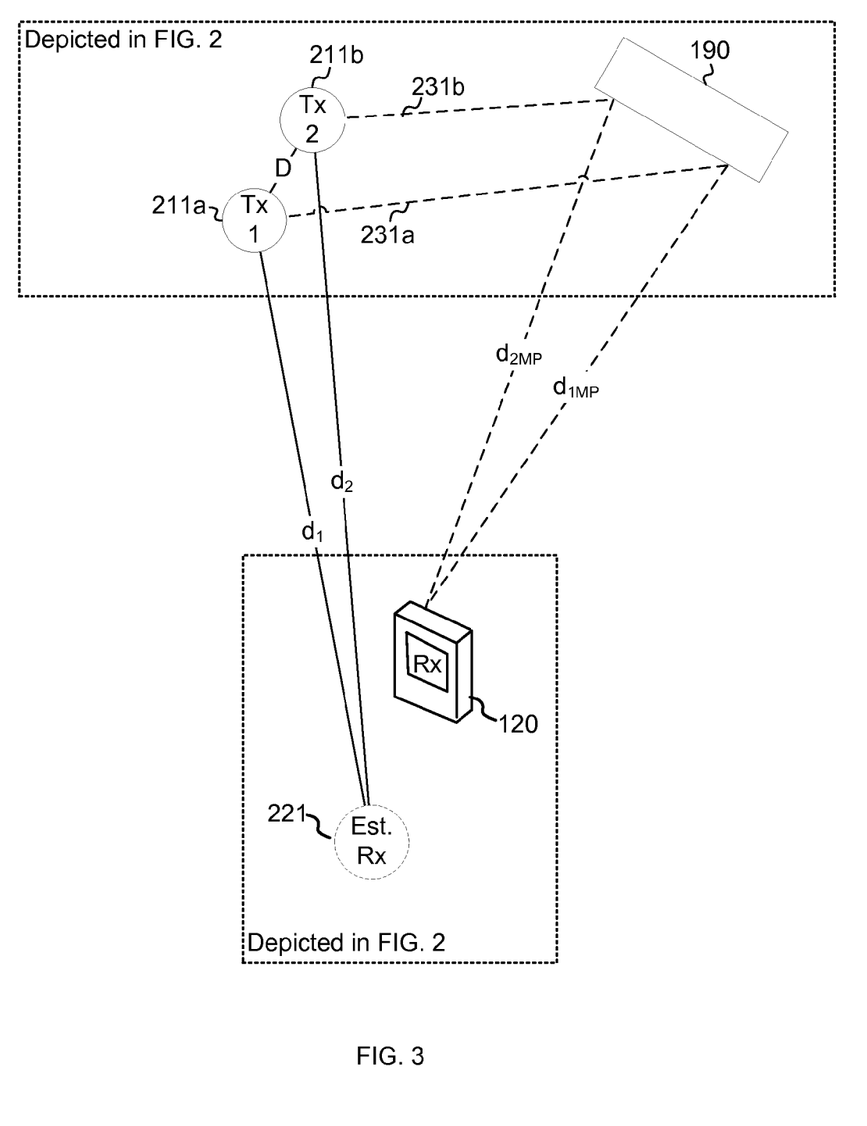
FIG. 3 depicts aspects of a set of co-located transmitters.

Attention is now drawn to FIG. 3, which depicts a location "Tx1" of a first co-located transmitter (e.g., transmitter 211a of FIG. 2) and a location "Tx2" of a second co-located transmitter (e.g., transmitter 211b of FIG. 2), which are shown to be separated by a distance D. FIG. 3 further depicts an actual location "Rx" of a receiver (e.g., receiver 120 of FIG. 2), and an estimated location "Est. Rx" of the receiver (e.g., estimated position 221 of FIG. 2).

FIG. 3 illustrates a LOS distance $d_1$ between Tx1 and Est. Rx, and a LOS distance $d_2$ between Tx2 and Est. Rx. These LOS distances may be determined by computing distances between position coordinates (e.g., latitude, longitude, altitude) of Est. Rx with position coordinates of Tx1 and Tx2, assuming the position coordinates are accurately known. Such a determination is only approximate in relation to the actual location Rx of the receiver when the actual location Rx of the receiver is not known, since the estimated location Est. Rx is likely based on range measurements corresponding to multipath signals from transmitters at different geographic positions (as illustrated in FIG. 2).

It is noted that, while FIG. 3 illustrates LOS distances between the estimated position 221 and the transmitters 211a and 211b, LOS distances may be similarly determined for other sets of co-located transmitters in FIG. 2. It is further noted that the discussion below similarly applies to the LOS distances and measured ranges that correspond to those other sets of co-located transmitters.

FIG. 3 also shows a multipath ("MP") distance ($d_{1MP}$) corresponding to a path distance traveled by a signal (e.g., the signal 231a) from the transmitter 211a to the receiver 120 after reflecting off of the object 190, and a MP distance ($d_{2MP}$) corresponding to a path distance traveled by a signal (e.g., the signal 231b) from the transmitter 211b to the receiver 120 after reflecting off of the object 190. In some cases, $d_1$ may be shorter than $d_2$, but $d_{1MP}$ may be longer than $d_{2MP}$. Relationships of individual measurements per transmitter may further help detect multipath signals and help map obstructions.

It is noted that a path distance is typically determined from the time a signal is transmitted from a transmitter to the time the signal is received at a receiver. Hence, unlike the LOS distance, the path distance may, in some cases, be determined accurately without accurate knowledge of the receiver's location—e.g., when an accurate clock reading is available at the receiver. In many cases, however, the clock setting at the receiver is based in part on knowledge of the receiver's position. Hence, it is normally the case that the path distances are only approximate. The difference between two path distances, however, may be more precise since the receiver clock setting is common to both measurements.

For pairs of co-located transmitters like transmitters 211a-b, a difference between the LOS distances $d_1$ and $d_2$ (referred to as $\Delta_{LOS}$) may be calculated, and then compared to a calculated difference between path distances relating to received ranging signals (referred to as $\Delta_{RANGE}$), which may include LOS signals and/or MP signals (e.g., $d_{1MP}$ and $d_{2MP}$). Alternatively, since $\Delta_{LOS}$ is relatively small (e.g., a maximum of the distance D between the co-located transmitters), the value of $\Delta_{LOS}$ may be set to zero (0). Of course, distances need not be used. Instead, travel time, time-of-arrival, time of transmission, and/or other information may be used. It is noted that calculating the $\Delta_{RANGE}$ may advantageously eliminate time bias.

Once calculated, $\Delta_{RANGE}$ may be used to identify whether its value is more likely to result from two LOS signals, an LOS signal and at least one MP signal, or all MP signals. In one embodiment for a given candidate position estimate of a receiver, the receiver may calculate $\Delta_{LOS}$ for that candidate position estimate (e.g., based on the position coordinates of each co-located transmitter, and position coordinates of that candidate position estimate). That value of $\Delta_{LOS}$ may then be compared to a $\Delta_{RANGE}$ value to determine how similar or dissimilar the measured values are from each other.

In some cases, if the observed $\Delta_{RANGE}$ from ranging results received by a receiver is greater than a threshold margin (e.g., $\Delta_{LOS}$, a predefined number of units, or the distance D), then it may be concluded that at least one of the ranging results resulted from a MP signal, and a weight or adjustment may be made to the MP signal. Removal of the MP ranging results is also possible. It may even be possible to estimate, to a degree, the extra length of the multipath signal from the relationship between $\Delta_{RANGE}$ and $\Delta_{LOS}$.

Alternative embodiments are described in more detail below with respect to different methodologies for using co-located transmitters to determine a position estimate.

Methodologies Using Co-Located Transmitters to Determine Position Estimate

Various aspects can be combined to form different embodiments where a trilateration algorithm can be influenced in many ways. For example, the relationship between $\Delta_{RANGE}$ and $\Delta_{LOS}$ may be exploited in many ways, including: comparing the ratio and/or difference of these two quantities against some thresholds to perform various functions; selection of a range measurement corresponding to a particular transmitter; determination of weights applied to a range measurement; or determination of a time bias. As another example, the relationship between $\Delta_{RANGE}$ and $\Delta_{LOS}$ at each candidate position may be used to calculate different metrics used in trilateration, including weights applied to range measurements, biases applied to range measurements, or selection of range measurements used.

Alternatively, $\Delta_{LOS}$ may be assumed to be equal to zero (0), or the distance between the transmitters may take its place, to thereby avoid having to calculate $\Delta_{LOS}$ for each candidate receiver location. $\Delta_{RANGE}$ or another relationship between the received signals may then be used to select weights and adjustments that may be applied to range measurements during trilateration computations. Alternatively, an initial estimate of the receiver location—e.g., $(x_0,y_0,z_0)$—may be determined, and then used to calculate $\Delta_{LOS}$ that will be used for particular candidate locations or all candidate positions.

In support of trilateration processing, adjustments to range measurements (PR) and corresponding weights (W) may take the form of:

$$PR_{New(k)} = PR_{Measured(k)} PR_{Adjustment(k)}, \text{ and}$$
$$W_{New(k)} = W_{Selected(k)} * W_{Adjustment(k)},$$

where $PR_{Measured(k)}$ is the range measurement, $PR_{Adjustment(k)}$ is the amount used to adjust the range measurement, $PR_{New(k)}$ is the adjusted range measurement, $W_{Selected(k)}$ is a weight applied to the range measurement, $W_{Adjustment(k)}$ is the amount used to adjust the weight, and $W_{New(k)}$ is the adjusted weight. In some embodiments, the value of $PR_{Adjustment(k)}$ may take on a value greater than zero (0), while the $W_{Adjustment(k)}$ may take on a value between zero (0) and one (1). The "k" references a particular transmitter from a set of transmitters 1 through n. It is noted that discussion in relation to range measurements also applies to pseudorange measurements (hence, the symbol PR can be either pseudorange or range).

Selection of range measurements, adjustments to range measurements, and adjustments to weights may vary. For example, where range measurements are determined based on information extracted from signals transmitted by co-located transmitters, the shortest range measurement may be selected for use during trilateration because it may be assumed that the shorter range measurement is more accurate than that longer range measurement (which is assumed to be a multipath measurement or a longer multipath measurement). As such, the longer range measurement may be omitted from trilateration processing (e.g., by applying a weight of zero), or its weight may be reduced because it is less accurate as a measurement of LOS distance than the shorter range measurement.

Alternatively, the weight of the shorter range measurement may be increased because it is more accurate than the longer range measurement. Or, where both signals are likely to be multipath signals based on comparisons of $\Delta_{RANGE}$ and $\Delta_{LOS}$, or comparisons of the line-of-sight distances and the path distances, a weight applied to the shorter range measurement may be decreased.

In some embodiments, the value of the shorter range measurement may be used to adjust the value of the longer range measurement. For example, the longer range measurement may be set to the value of the shorter range measurement (e.g., by subtracting $\Delta_{RANGE}$ from the longer range measurement, or by replacing the value of the longer measurement with the shorter range measurement). An alternative adjustment may be made by subtraction of some or all of the distance that separates the co-located transmitters. The adjusted range measurement may then be used during trilateration together with selected weights, or adjusted weights.

Range measurements corresponding to co-located transmitters may be adjusted in other ways based on the $\Delta_{RANGE}$ value for that set. For example, some fraction or multiple of the $\Delta_{RANGE}$ value may be used to adjust (e.g., reduce) either of the range measurements.

It is noted that any of the above approaches may be combined with each other.

Figure 4A:
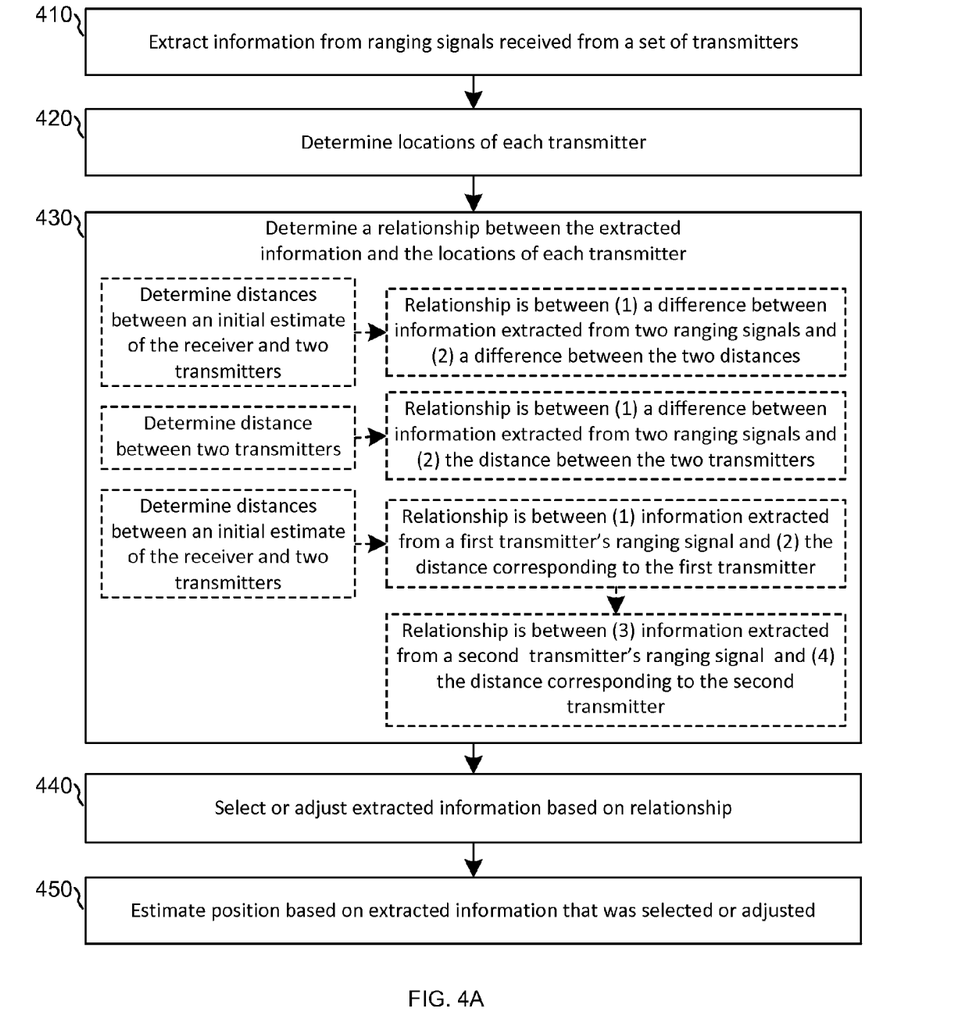
FIG. 4A illustrates a process for estimating the position of a receiver using information extracted from signals transmitted by co-located transmitters.

Attention is drawn to FIG. 4A, which depicts different methodologies for estimating the position of a receiver using information extracted from signals transmitted by co-located transmitters. Examples are given for two ranging signals transmitted by two transmitters. However, one of skill in the art will appreciate that the methodologies can be applied to more than two ranging signals transmitted by a corresponding number of transmitters with mathematical adjustment understood by one of skill in the art.

As shown in FIG. 4A, information is extracted from two ranging signals received from two co-located transmitters (410). By way of example, extracted information may include a range measurement associated with the travel time of a signal, a time-of-arrival of the signal, or a transmission time of the signal. A location of each transmitter may also be determined (420). For example, a location (e.g. east, north, up (ENU)) for a particular transmitter may be provided by data contained within the signal, or may be looked up based on an identifier provided by data contained within the signal.

A relationship between the extracted information and the locations of each transmitter is determined (430).

In one embodiment, LOS distances between an initial estimate of the receiver and the two transmitters may be determined. The relationship may relate to a difference between (1) a measure of difference between information extracted from the two ranging signals (e.g., time-of-arrival, range measurement), and (2) a measure of difference between the LOS distances. The relationship may be analyzed, and the analysis may determine a selection of or adjustment to extracted information from one or more or the ranging signals (440) for use during trilateration processing that produces an estimate of the receiver's position (450).

In another embodiment, a distance between the two transmitters may be determined. The relationship may relate to a difference between (1) a measure of difference between information extracted from the two ranging signals (e.g., time-of-arrival, range measurement), and (2) a measure of the distance between the transmitters. The relationship may be analyzed, and the analysis may determine a selection of or adjustment to extracted information from one or more or the ranging signals (440) for use during trilateration processing that produces an estimate of the receiver's position (450).

In yet another embodiment, LOS distances between an initial estimate of the receiver and the two transmitters may be determined. The relationship may relate to a measure of difference between (1) information extracted from a first transmitter's ranging signal (e.g., time-of-arrival, range measurement), and (2) the LOS distance corresponding to the first transmitter, and may further relate to a measure of difference between (3) information extracted from a second transmitter's ranging signal (e.g., time-of-arrival, range measurement), and (4) the LOS distance corresponding to the second transmitter. The relationship may be analyzed, and the analysis may determine a selection of or adjustment to extracted information from one or more or the ranging signals (440) for use during trilateration processing that produces an estimate of the receiver's position (450). Combinations of the above relationships are also possible.

Figure 4B:
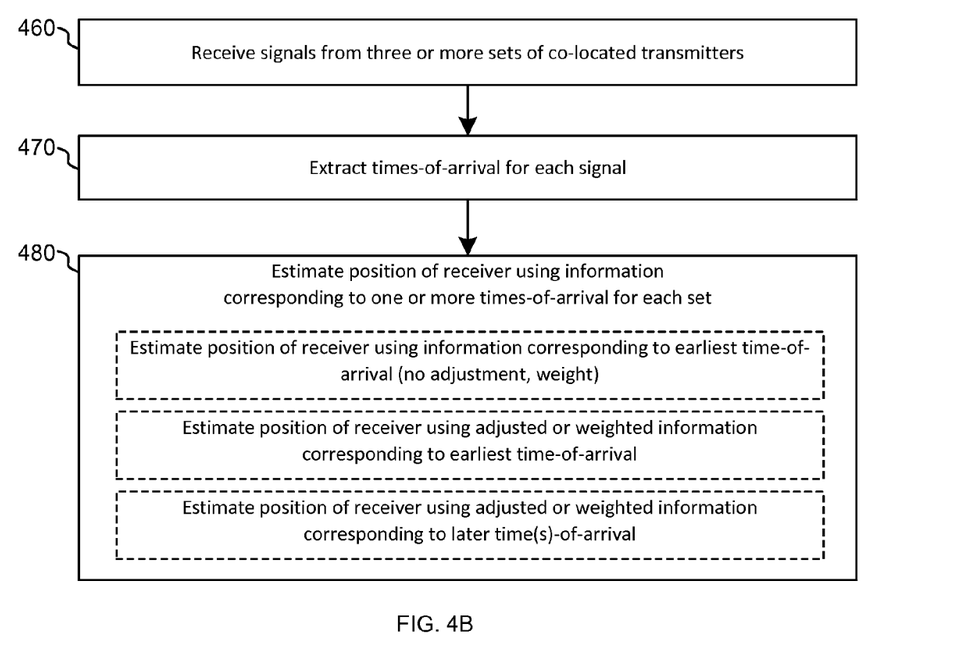
FIG. 4B illustrates a process for computing a position estimate for a receiver using time-of-arrival data extracted from signals transmitted by co-located transmitters.

Attention is drawn to FIG. 4B, which depicts a methodology 400 for computing a position estimate for a receiver using time-of-arrival data extracted from signals transmitted by co-located transmitters.

As shown in FIG. 4B, signals corresponding to three or more sets of co-located transmitters are received (460). Times-of-arrival corresponding to each signal are extracted (470). Then, the receiver's position is estimated using information corresponding to at least one time-of-arrival from each set of co-located transmitters (490).

The estimate may use the earliest time-of-arrival from each set of transmitters where each signal within a set is assumed to have been transmitted concurrently. Optionally, the earlier time-of-arrival may be adjusted or weighted to account for some assumed or determined error associated with that time-of-arrival, such as effect of multipath, bias, and others. Optionally, the estimate may be based on a later time-of-arrival, an adjusted value of the later time-of-arrival, or a weighted value of the later time-of-arrival. Optionally, adjusting, weighting, and selecting a time-of-arrival may be based on differences between times-of-arrival corresponding to co-located transmitters. The position estimation may also be based upon combinations of these various approaches.

A similar methodology to that shown in FIG. 4B may be followed using range measurements instead of times-of-arrival. In such a methodology, shorter and longer range measurements may be handled similarly to earlier and later times-of-arrivals.

It is noted that a distance may be represented in units of length, time or other suitable units. Similarly, the measure or size of a difference may be represented in length, time or other units. Distance values can be compared to time values by using proper mathematical conversion of any unit of measurement (e.g., time, distance, or other). For example, any of a time-of-arrival, time of transmission, travel time, and path length corresponding to a signal may be compared to other such measurements or to a line-of-sight distance between a transmitter and a true or estimated position of a receiver.

It is further noted that two values may be compared to each other to determine if they are different, by means of a mathematical operation. This is referred to as a measure of difference between the values. Examples of compared values include: (A1) a measure of difference between a LOS distance and (A2) a path distance; (B1) a first measure of difference between LOS distances and (B2) a second measure of difference between path distances; and (C1) a third measure of difference between transmitter locations and (C2) the second measure of the difference between the path distances. Each comparison may occur after each value has been adjusted by some mathematical operation (e.g., a scalar times the value, a scalar plus the value, value$^2$, |value|, value converted to different units of measurement, or some other operation that produces a new value from the original value). In some embodiments where two values are adjusted prior to comparison, a determination that the two adjusted values are different implies that the two values, prior to adjustment, are different.

Comparisons may determine if the values are different from each other by a threshold level. In this case a measure of difference of the two values is compared to the threshold level and different actions are taken if depending upon whether or not the measure of difference exceeds the threshold level.

A suitable threshold level may be determined depending on the mathematical operation applied to each value. In this way, one threshold level may be used to compare unadjusted values, and another threshold level may be used to compare adjusted values (e.g., where the values are squared).

When it is stated that a measure of a difference between values A and B is determined, it does not necessarily mean that A minus B is computed, or that a function of A minus B is computed. Rather, it means that the comparison results in a number that represents dissimilarity between the two values. It is to be understood that a "difference" is to be broadly interpreted. For example, one interpretation of "difference" is a degree or an amount by which things are different/not the same. By way of example, not limitation, determining relative size is one way of quantifying a difference. By way of example, not limitation, subtraction is another way of quantifying a difference. One of skill in the art will appreciate alternative ways of representing a difference.

By way of example, a measure of a difference associated with subtraction of two quantities A and B may be one, or a mathematical combination of: subtraction of A from B; subtraction of B from A; the absolute value of the subtraction of A from B; the subtraction of A from B with the result raised to a numerical power; the subtraction of B from A with the result raised to a numerical value; and the absolute value of the subtraction of A from B with the result raised to a numerical power.

By way of example, a measure of a difference associated with relative size between two quantities A and B may be one, or a mathematical combination of: the ratio of A to B; the ratio of B to A; the absolute value of the ratio of A to B; and the absolute value of the ratio of B to A.

Additional Methodologies

Functionality and operation disclosed herein may be embodied as one or more methods implemented by processor(s) at one or more many locations. Non-transitory processor-readable media embodying program instructions adapted to be executed to implement the method(s) are also contemplated.

By way of example, not by way of limitation, method(s) may comprise: extracting information from a first ranging signal received from a first transmitter; extracting information from a second ranging signal received from a second transmitter; determining a first location of the first transmitter; determining a second location of the second transmitter, wherein the first location and the second location are separated by no more than 100 meters; and determining an estimated position of the receiver based on one or more relationships between the information extracted from the first and second ranging signals and information corresponding to the first and second locations.

Method(s) may further or alternatively comprise: determining a weight based on the one or more relationships; and using the weight to determine the estimated position. Method(s) may further or alternatively comprise: determining a time bias based on the one or more relationships; and using the time bias to determine the estimated position. Method(s) may further or alternatively comprise: determining whether the first ranging signal or the second ranging signal is a multipath signal based on the one or more relationships.

Method(s) may further or alternatively comprise: determining a first line-of-sight distance between an initial estimate of the receiver's position and the first location of the first transmitter; determining a second line-of-sight distance between the initial estimate of the receiver's position and the second location of the second transmitter; determining a first path distance between the receiver and the first location of the first transmitter, wherein the first path distance corresponds to a first distance travel by the first ranging signal; determining a second path distance between the receiver and the second location of the second transmitter, wherein the second path distance corresponds to a second distance travel by the second ranging signal; and determining said estimated position of the receiver using the first line-of-sight distance, the second line-of-sight distance, the first path distance, and the second path distance.

Method(s) may further or alternatively comprise: determining a first measure of difference between the first and second path distances; determining a second measure of difference between the first and second line-of-sight distances; and determining if the first measure exceeds the second measure by a first amount. When the first measure exceeds the second measure by a first amount, method(s) disclosed herein may be performed.

Method(s) may further or alternatively comprise: determining a first path distance between the receiver and the first location of the first transmitter, wherein the first path distance corresponds to a first distance travel by the first ranging signal; determining a second path distance between the receiver and the second location of the second transmitter, wherein the second path distance corresponds to a second distance travel by the second ranging signal; determining a first measure of difference between the first and second path distances; determining a second measure of difference between the first location of the first transmitter and the second location of the second transmitter; and determining if the first measure exceeds the second measure by a first amount. When the first measure exceeds the second measure by a first amount, method(s) disclosed herein may be performed.

Method(s) may further or alternatively comprise: determining a first line-of-sight distance between an initial estimate of the receiver's position and the first location of the first transmitter; determining a second line-of-sight distance between the initial estimate of the receiver's position and the second location of the second transmitter; determining a first path distance between the receiver and the first location of the first transmitter, wherein the first path distance corresponds to a first distance travel by the first ranging signal; determining a second path distance between the receiver and the second location of the second transmitter, wherein the second path distance corresponds to a second distance travel by the second ranging signal; determining a first measure of difference between the first path distance and the first line-of-sight distance; determining a second measure of difference between the second path distance and the second line-of-sight distance; and determining if the first measure is less than or greater than the second measure. When the first measure is less than the second measure, method(s) disclosed herein may be performed. When the second measure is less than the first measure, method(s) disclosed herein may be performed.

Method(s) may further or alternatively comprise: determining a first line-of-sight distance between an initial estimate of the receiver's position and the first location of the first transmitter; determining a second line-of-sight distance between the initial estimate of the receiver's position and the second location of the second transmitter; determining a first path distance between the receiver and the first location of the first transmitter wherein the first path distance corresponds to a first distance travel by the first ranging signal; determining a second path distance between the receiver and the second location of the second transmitter wherein the second path distance corresponds to a second distance travel by the second ranging signal; determining if the first path distance is greater than the first line-of-sight distance; and determining if the second path distance is greater than the second line-of-sight distance. When the first path distance is greater than the first line-of-sight distance, or if the second path distance is greater than the second line-of-sight distance, method(s) disclosed herein may be performed.

Method(s) may further or alternatively comprise: determining a line-of-sight distance between initial estimate of the receiver's position and the first location of the first transmitter; determining a second line-of-sight distance between the initial estimate of the receiver's position and the second location of the second transmitter; determining a first path distance between the receiver and the first location of the first transmitter wherein the first path distance corresponds to a first distance travel by the first ranging signal; determining a second path distance between the receiver and the second location of the second transmitter wherein the second path distance corresponds to a second distance travel by the second ranging signal; determining a first measure of difference between the first line-of-sight distance and the first path distance; determining a second measure of difference between the second line-of-sight distance and the second path distance; based on determining that the first measure is less than the second measure, determining the estimated position using the information extracted from the first ranging signal and without using the information extracted from the second ranging signal; and based on determining that the second measure is less than the first measure, determining the estimated position using the information extracted from the second ranging signal and without using the information extracted from the first ranging signal.

When the first ranging signal and the second ranging signal are concurrently transmitted, methods may comprise: based on determining that the first ranging signal arrived at the receiver before the second ranging signal arrived at the receiver, determining the estimated position using the information extracted from the first ranging signal and without using the information extracted from the second ranging signal, or adjusting the information extracted from the second ranging signal (wherein the estimated position is determined using the adjusted information extracted from the second ranging signal); and based on determining that the second ranging signal arrived at the receiver before the first ranging signal arrived at the receiver, determining the estimated position using the information extracted from the second ranging signal and without using the information extracted from the first ranging signal, or adjusting the information extracted from the first ranging signal (wherein the estimated position is determined using the adjusted information extracted from the first ranging signal).

When the first ranging signal and the second ranging signal are concurrently received by a receiver, method may comprise: based on determining that the first ranging signal was transmitted after the second ranging signal was transmitted, determining the estimated position using the information extracted from the first ranging signal and without using the information extracted from the second ranging signal, or adjusting the information extracted from the second ranging signal (wherein the estimated position is determined using the adjusted information extracted from the second ranging signal); and based on determining that the second ranging signal was transmitted after the first ranging signal was transmitted, determining the estimated position using the information extracted from the second ranging signal and without using the information extracted from the first ranging signal, or adjusting the information extracted from the first ranging signal (wherein the estimated position is determined using the adjusted information extracted from the first ranging signal).

In accordance with some aspects, the first measure of difference between the first line-of-sight distance and the first path distance is the absolute value or the square of the quantity: first line-of-sight distance minus the first path difference. In accordance with some aspects, the second measure of difference between the second line-of-sight distance and the second path distance is the absolute value or the square of the quantity: second line-of-sight distance minus the second path distance.

In accordance with some aspects, the information extracted from the first ranging signal includes a first range measurement associated with the first transmitter, a first time of arrival of the first ranging signal or a first time of transmission of the first ranging signal, and wherein the information extracted from the second ranging signal includes a second range measurement associated with the second transmitter, a second time of arrival of the second ranging signal or a second time of transmission of the first ranging signal.

By way of example, not by way of limitation, method(s) may comprise: extracting a first time-of-arrival from a first signal transmitted by first transmitter of a first set of transmitters; extracting a second time-of-arrival from a second signal transmitted by a second transmitter of the first set of transmitters; and estimating the position of the receiver using data corresponding to at least one of the first time-of-arrival and the second time-of-arrival.

Method(s) may further or alternatively comprise: estimating the position of the receiver using an adjustment to the data, wherein the adjustment is based on a first estimated distance between a first location and one of the first and second transmitters.

Method(s) may further or alternatively comprise: estimating the position of the receiver using an adjustment to the data, wherein the adjustment is based on both of a first estimated distance between a first location and the first transmitter, and a second estimated distance between the first location and the second transmitter. In accordance with some aspects, the first signal and the second signal are transmitted at the same time.

Method(s) may further or alternatively comprise: determining which of the first time-of-arrival and the second timeof-arrival is earlier or later. In accordance with some aspects, the position of the receiver is estimated without using data corresponding to the later of the first time-of-arrival and the second time of-arrival. In accordance with some aspects, the position of the receiver is estimated using data corresponding to the earlier of the first time-of-arrival and the second time of-arrival.

Method(s) may further or alternatively comprise: adjusting data corresponding to the later of the first time-of-arrival and the second time-of-arrival, wherein the position of the receiver is estimated using both of data corresponding to the earlier of the first time-of-arrival and the second time of-arrival, and the adjusted data corresponding to the later of the first time-of-arrival and the second time of-arrival. In accordance with some aspects, the data corresponding to the earlier of the first time-of-arrival and the second time of-arrival is not adjusted in the same manner as data corresponding to the later of the first time-of-arrival and the second time of-arrival is adjusted.

Method(s) may further or alternatively comprise: determining a difference between the first time-of-arrival and the second time-of-arrival; generating adjusted data by adjusting the data corresponding to the at least one of the first time-of-arrival and the second time-of-arrival based on the difference, wherein the position of the receiver is estimated based on the adjusted data. In accordance with some aspects, the adjusted data is generated based on a weight applied to the difference between the first time-of-arrival and the second time-of-arrival. In accordance with some aspects, an absolute value of the weight is less than or equal to 1. In accordance with some aspects, the adjusted data is generated by adjusting data corresponding to only one of the first time-of-arrival and the second time-of-arrival.

Method(s) may further or alternatively comprise: identifying, from a data source, an adjustment amount that corresponds to the difference between the first time-of-arrival and the second time-of-arrival, wherein the adjusted data is generated by adjusting the data corresponding to the first time-of-arrival and the second time-of-arrival based on the adjustment amount retrieved from the data source.

Method(s) may further or alternatively comprise: determining, based on the first time-of-arrival, a first estimate of distance traveled by the first signal from the first transmitter; determining, based on the second time-of-arrival, a second estimate of distance traveled by the second signal from the second transmitter, wherein the data corresponding to the at least one of the first time-of-arrival and the second time-of-arrival includes data corresponding to at least one of the first estimate of distance and the second estimate of distance.

Method(s) may further or alternatively comprise: determining a first difference value corresponding to a difference between the first time-of-arrival and the second time-of-arrival; determining a second difference value corresponding to a difference between a first estimated distance that separates the first transmitter and a first location and a second estimated distance that separates the second transmitter and the first location; and comparing the first difference value and the second difference value.

Method(s) may further or alternatively comprise: generating adjusted data by adjusting the data corresponding to the at least one of the first time-of-arrival and the second time-of-arrival when the comparison indicates the first difference value exceeds the second difference value by a threshold amount, wherein the position of the receiver is estimated based on the adjusted data.

Method(s) may further or alternatively comprise: extracting additional times-of-arrival from additional signals transmitted by additional transmitters of additional sets of transmitters; and estimating the position of the receiver using data corresponding to each of the additional times-of-arrival.

Method(s) may further or alternatively comprise: determining that the first and second transmitters are in the first set of transmitters, and that each of the additional transmitters is in a different one of the additional sets of transmitters. In accordance with some aspects, a distance that separates the first and second transmitters is shorter than all of each distance that separates the first transmitter and each of the additional transmitters, and each distance that separates the second transmitter and each of the additional transmitters. In accordance with some aspects, all transmitters in the first set of transmitters are separated from one another by no more than a first distance, wherein the first distance is shorter than all distances between each transmitter in the first set of transmitters and each of a plurality of other transmitters that are not in the first set.

Example System and Other Aspects

Figure 5:
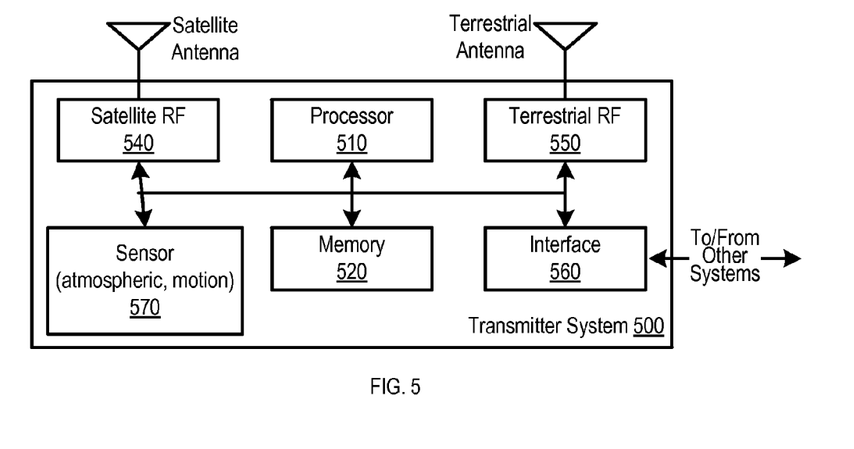
FIG. 5 depicts aspects of a transmitter system.

FIG. 5 illustrates details of transmitter system 500 at which signals may be generated and transmitted. Transmitter system 500 may include processor 510 that carries out signal processing (e.g., interpreting received signals and generating transmission signals). One or more memories 520 may provide storage and retrieval of data and/or executable instructions for performing functions described herein. Transmitter system 500 may further include one or more antenna components (e.g., satellite antenna or terrestrial antenna) for transmitting and receiving signals, satellite RF component 540 for receiving satellite signals, from which location information and/or other information (e.g., timing, dilution of precision (DOP), or other) may be extracted, terrestrial RF component 550 for receiving signals from a terrestrial network, and/or for generating and sending output signals, and interface 560 for communicating with other systems. Transmitter system 500 may also include one or more environmental sensors 570 for sensing environmental conditions (e.g., pressure, temperature, humidity, wind, sound, or other), which may be compared to such conditions as sensed at a receiver in order to estimate a position of the receiver based on similarities and differences between the conditions at transmitter system 500 and the receiver. It is noted that transmitter system 500 may be implemented by the transmitters described herein, which may alternatively take on other forms as known by one of skill in the art. Each transmitter system 500 may also include various elements as are known or developed in the art for providing output signals to, and receiving input signals from, the antennas, including analog or digital logic and power circuitry, signal processing circuitry, tuning circuitry, buffer and power amplifiers, and the like.

Figure 6:
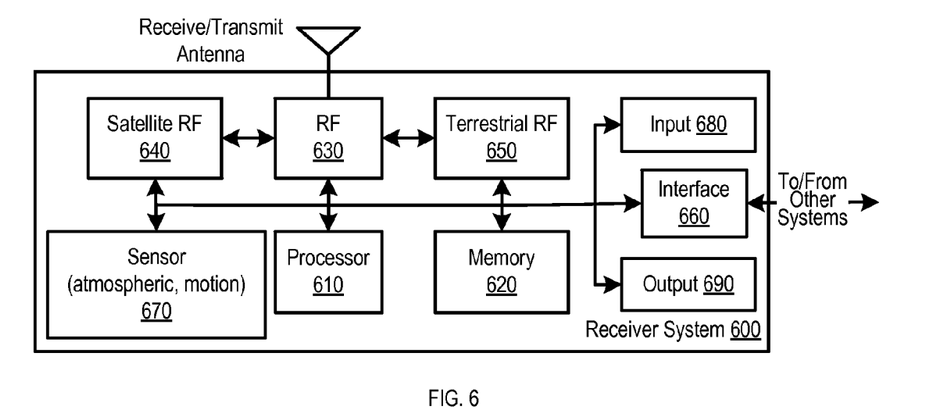
FIG. 6 depicts aspects of a receiver system.

FIG. 6 illustrates details of receiver system 600, at which signals from transmitters (e.g., transmitter system 500) may be received and processed to extract information used to compute an estimated position of receiver system 600. Receiver system 600 may include any of a variety of electronic devices configured to receive RF or other signaling using wireless means (radio frequency, Wi-Fi, Wi-Max, Bluetooth, or other wireless channels as is known or later developed in the art), or wired means (e.g., Ethernet, USB, flash RAM, or other similar channels as is known or later developed in the art). Each receiver system 600 may be in the form of a cellular or smart phone, a tablet device, a PDA, a notebook or other computing device. It is noted that User Equipment (UE), Mobile Station (MS), User Terminal (UT), SUPL Enabled Terminal (SET), Receiver (Rx), and Mobile Device may be used to refer to receiver system 600. As shown, RF component 630 may control the exchange of information with other systems (e.g., satellite, terrestrial). Signal processing may occur at satellite component 640, or terrestrial component 650, which may use separate or shared resources such as antennas, RF circuitry, and the like. One or more memories 620 may be coupled to a processor 10 to provide storage and retrieval of data and/or instructions relating to methodologies described herein that may be executed by processor 610. Receiver system 600 may further include one or more sensors 670 for measuring environmental conditions like pressure, temperature, humidity, acceleration, direction of travel, wind force, wind direction, sound, or other conditions. Receiver system 600 may further include input and output (I/O) components 680 and 690, which may include a keypad, touchscreen display, camera, microphone, speaker, or others, which may be controlled by means known in the art. It is noted that receiver system 500 may be implemented by the receivers described herein, which may alternatively take on other forms as known by one of skill in the art.

In some embodiments, transmitter system 500 and/or receiver system 600 may be connected, via various wired or wireless communication link, to a server system (not shown), which may receive/send information from/to transmitter system 500 and/or receiver system 600. The server system may also control operations of transmitter system 500 and/or receiver system 600. Some or all processing that can be performed at transmitter system 500 and/or receiver system 600 may alternatively be performed by a one or more processors that are remote from those systems (e.g., in a different city, state, region, or country). Such remote processors may be located at the server system. Thus, processing may be geographically distributed. Processing in one system or component may be initiated by another system (e.g., upon receipt of signals or information from the other system).

The various illustrative systems, methods, logical features, blocks, modules, components, circuits, and algorithm steps described herein may be implemented, performed, or otherwise controlled by suitable hardware known or later developed in the art, or by firmware or software executed by processor(s), or any such combination of hardware, software and firmware. Systems may include one or more devices or means that implement the functionality (e.g., embodied as methods) described herein. For example, such devices or means may include processor(s) that, when executing instructions, perform any of the methods disclosed herein. Such instructions can be embodied in software, firmware and/or hardware. A processor (also referred to as a "processing device") may perform or otherwise carry out any of the operational steps, processing steps, computational steps, method steps, or other functionality disclosed herein, including analysis, manipulation, conversion or creation of data, or other operations on data. A processor may include a general purpose processor, a digital signal processor (DSP), an integrated circuit, a server, other programmable logic device, or any combination thereof. A processor may be a conventional processor, microprocessor, controller, microcontroller, or state machine. A processor can also refer to a chip or part of a chip (e.g., semiconductor chip). The term "processor" may refer to one, two or more processors of the same or different types. It is noted that a computer, computing device and user device, and the like, may refer to devices that include a processor, or may be equivalent to the processor itself.

A "memory" may be accessible by a processor such that the processor can read information from and/or write information to the memory. Memory may be integral with or separate from the processor. Instructions may reside in such memory (e.g., RAM, flash, ROM, EPROM, EEPROM, registers, disk storage), or any other form of storage medium. Memory may include a non-transitory processor-readable medium having processor-readable program code (e.g., instructions) embodied therein that is adapted to be executed to implement the various methods disclosed herein. Processor-readable media be any available storage media, including non-volatile media (e.g., optical, magnetic, semiconductor) and carrier waves that transfer data and instructions through wireless, optical, or wired signaling media over a network using network transfer protocols. Instructions embodied in software can be downloaded to reside on and operated from different platforms used by known operating systems. Instructions embodied in firmware can be contained in an integrated circuit or other suitable device.

Functionality disclosed herein may be programmed into any of a variety of circuitry that is suitable for such purpose as understood by one of skill in the art. For example, functionality may be embodied in processors having software-based circuit emulation, discrete logic, custom devices, neural logic, quantum devices, PLDs, FPGA, PAL, ASIC, MOSFET, CMOS, ECL, polymer technologies, mixed analog and digital, and hybrids thereof. Data, instructions, commands, information, signals, bits, symbols, and chips disclosed herein may be represented by voltages, currents, electromagnetic waves, magnetic fields or particles, optical fields or particles, or any combination thereof. Computing networks may be used to carry out functionality and may include hardware components (servers, monitors, I/O, network connection). Application programs may carry out aspects by receiving, converting, processing, storing, retrieving, transferring and/or exporting data, which may be stored in a hierarchical, network, relational, non-relational, object-oriented, or other data source. A data source may be used to store information, and may include any storage devices known by one of skill in the art. As used herein, computer-readable media includes all forms of computer-readable medium except, to the extent that such media is deemed to be non-statutory (e.g., transitory propagating signals).

Features in system and apparatus figures that are illustrated as rectangles may refer to hardware, firmware or software. It is noted that lines linking two such features may be illustrative of data transfer between those features. Such transfer may occur directly between those features or through intermediate features even if not illustrated. Where no line connects two features, transfer of data between those features is contemplated unless otherwise stated. Accordingly, the lines are provide to illustrate certain aspects, but should not be interpreted as limiting. The words "comprise," "comprising," "include," "including" and the like are to be construed in an inclusive sense (i.e., not limited to) as opposed to an exclusive sense (i.e., consisting only of). Words using the singular or plural number also include the plural or singular number respectively. The words "or" or "and" cover both any of the items and all of the items in a list. "Some" and "any" and "at least one" refers to one or more. The disclosure is not intended to be limited to the aspects shown herein but is to be accorded the widest scope understood by a skilled artisan, including equivalent systems and methods.

The invention claimed is:

1. A method for estimating a position of receiver, wherein the method comprises:

extracting information from a first ranging signal received from a first transmitter;

extracting information from a second ranging signal received from a second transmitter, wherein the first ranging signal and the second ranging signal were concurrently transmitted;

determining a first location of the first transmitter;

determining a second location of the second transmitter, wherein the first location and the second location are separated by no more than 100 meters;

determining an estimated position of the receiver based on one or more relationships between the information extracted from the first and second ranging signals and information corresponding to the first and second locations;

based on determining that the first ranging signal arrived at the receiver before the second ranging signal arrived at the receiver, (i) determining the estimated position using the information extracted from the first ranging signal and without using the information extracted from the second ranging signal, or (ii) adjusting the information extracted from the second ranging signal and determining the estimated position using the adjusted information extracted from the second ranging signal; and based on determining that the second ranging signal arrived at the receiver before the first ranging signal arrived at the receiver, (i) determining the estimated position using the information extracted from the second ranging signal and without using the information extracted from the first ranging signal, or (ii) adjusting the information extracted from the first ranging signal and determining the estimated position using the adjusted information extracted from the first ranging signal.

2. The method of claim 1, wherein the method comprises:
determining a weight based on the one or more relationships; and
using the weight to determine the estimated position.

3. The method of claim 1, wherein the method comprises:
determining a time bias based on the one or more relationships; and
using the time bias to determine the estimated position.

4. A method for estimating a position of receiver, wherein the method comprises:
extracting information from a first ranging signal received from a first transmitter;
extracting information from a second ranging signal received from a second transmitter;
determining a first location of the first transmitter;
determining a second location of the second transmitter, wherein the first location and the second location are separated by no more than 100 meters;
determining an estimated position of the receiver based on one or more relationships between the information extracted from the first and second ranging signals and information corresponding to the first and second locations;
determining a first line-of-sight distance between an initial estimate of the receiver's position and the first location of the first transmitter;
determining a second line-of-sight distance between the initial estimate of the receiver's position and the second location of the second transmitter;
determining a first path distance between the receiver and the first location of the first transmitter, wherein the first path distance corresponds to a first distance travel by the first ranging signal;
determining a second path distance between the receiver and the second location of the second transmitter, wherein the second path distance corresponds to a second distance travel by the second ranging signal; and
determining said estimated position of the receiver using the first line-of-sight distance, the second line-of-sight distance, the first path distance, and the second path distance;
determining a first measure of difference between the first and second path distances;
determining a second measure of difference between the first and second line-of-sight distances;
determining if the first measure exceeds the second measure by a first amount;
based on determining that the first measure exceeds the second measure by a first amount and the first path distance is less than the second path distance, (i) determining the estimated position using the information extracted from the first ranging signal and without using the information extracted from the second ranging signal, or (ii) adjusting the information extracted from the second ranging signal and determining the estimated position using the adjusted information extracted from the second ranging signal; and
based on determining that the first measure exceeds the second measure by a first amount and the second path distance is less than the first path distance, (i) determining the estimated position using the information extracted from the second ranging signal and without using the information extracted from the first ranging signal, or (ii) adjusting the information extracted from the first ranging signal and determining the estimated position using the adjusted information extracted from the first ranging signal.

5. The method of claim 4, wherein the method comprises:
determining a weight based on the one or more relationships; and
using the weight to determine the estimated position.

6. The method of claim 4 wherein the method comprises:
determining a time bias based on the one or more relationships; and
using the time bias to determine the estimated position.

7. A method for estimating a position of receiver, wherein the method comprises:
extracting information from a first ranging signal received from a first transmitter;
extracting information from a second ranging signal received from a second transmitter, wherein the first ranging signal and the second ranging signal were concurrently transmitted;
determining a first location of the first transmitter;
determining a second location of the second transmitter, wherein the first location and the second location are separated by no more than 100 meters;
determining an estimated position of the receiver based on one or more relationships between the information extracted from the first and second ranging signals and information corresponding to the first and second locations;
determining a first line-of-sight distance between an initial estimate of the receiver's position and the first location of the first transmitter;
determining a second line-of-sight distance between the initial estimate of the receiver's position and the second location of the second transmitter;
determining a first path distance between the receiver and the first location of the first transmitter, wherein the first path distance corresponds to a first distance travel by the first ranging signal;

determining a second path distance between the receiver and the second location of the second transmitter, wherein the second path distance corresponds to a second distance travel by the second ranging signal;

determining said estimated position of the receiver using the first line-of-sight distance, the second line-of-sight distance, the first path distance, and the second path distance;

determining a first measure of difference between the first and second path distances;

determining a second measure of difference between the first and second line-of-sight distances;

determining if the first measure exceeds the second measure by a first amount;

based on determining that the first measure exceeds the second measure by the first amount and the first ranging signal arrived at the receiver before the second ranging signal arrived at the receiver, (i) determining the estimated position using the information extracted from the first ranging signal and without using the information extracted from the second ranging signal, or (ii) adjusting the information extracted from the second ranging signal and determining the estimated position using the adjusted information extracted from the second ranging signal; and based on determining that the first measure exceeds the second measure by the first amount and the second ranging signal arrived at the receiver before the first ranging signal arrived at the receiver, (i) determining the estimated position using the information extracted from the second ranging signal and without using the information extracted from the first ranging signal, or (ii) adjusting the information extracted from the first ranging signal and determining the estimated position using the adjusted information extracted from the first ranging signal.

8. The method of claim 7, wherein the method comprises:
determining a weight based on the one or more relationships; and
using the weight to determine the estimated position.

9. The method of claim 7, wherein the method comprises:
determining a time bias based on the one or more relationships; and
using the time bias to determine the estimated position.

10. A non-transitory machine-readable medium embodying program instructions adapted to be executed to implement a method for estimating a position of receiver, the method comprising:

extracting information from a first ranging signal received from a first transmitter;

extracting information from a second ranging signal received from a second transmitter, wherein the first ranging signal and the second ranging signal were concurrently transmitted;

determining a first location of the first transmitter;

determining a second location of the second transmitter, wherein the first location and the second location are separated by no more than 100 meters;

determining an estimated position of the receiver based on one or more relationships between the information extracted from the first and second ranging signals and information corresponding to the first and second locations;

based on determining that the first ranging signal arrived at the receiver before the second ranging signal arrived at the receiver, (i) determining the estimated position using the information extracted from the first ranging signal and without using the information extracted from the second ranging signal, or (ii) adjusting the information extracted from the second ranging signal and determining the estimated position using the adjusted information extracted from the second ranging signal; and based on determining that the second ranging signal arrived at the receiver before the first ranging signal arrived at the receiver, (i) determining the estimated position using the information extracted from the second ranging signal and without using the information extracted from the first ranging signal, or (ii) adjusting the information extracted from the first ranging signal and determining the estimated position using the adjusted information extracted from the first ranging signal.

11. The non-transitory machine-readable medium of claim 10, wherein the method comprises:
determining a weight based on the one or more relationships; and
using the weight to determine the estimated position.

12. The non-transitory machine-readable medium of claim 10, wherein the method comprises:
determining a time bias based on the one or more relationships; and
using the time bias to determine the estimated position.

13. A non-transitory machine-readable medium embodying program instructions adapted to be executed to implement a method for estimating a position of receiver, the method comprising:

extracting information from a first ranging signal received from a first transmitter;

extracting information from a second ranging signal received from a second transmitter;

determining a first location of the first transmitter;

determining a second location of the second transmitter, wherein the first location and the second location are separated by no more than 100 meters;

determining an estimated position of the receiver based on one or more relationships between the information extracted from the first and second ranging signals and information corresponding to the first and second locations;

determining a first line-of-sight distance between an initial estimate of the receiver's position and the first location of the first transmitter;

determining a second line-of-sight distance between the initial estimate of the receiver's position and the second location of the second transmitter;

determining a first path distance between the receiver and the first location of the first transmitter, wherein the first path distance corresponds to a first distance travel by the first ranging signal;

determining a second path distance between the receiver and the second location of the second transmitter, wherein the second path distance corresponds to a second distance travel by the second ranging signal; and determining said estimated position of the receiver using the first line-of-sight distance, the second line-of-sight distance, the first path distance, and the second path distance;

determining a first measure of difference between the first and second path distances;

determining a second measure of difference between the first and second line-of-sight distances;

determining if the first measure exceeds the second measure by a first amount;

based on determining that the first measure exceeds the second measure by a first amount and the first path distance is less than the second path distance, (i) determining the estimated position using the information extracted from the first ranging signal and without using the information extracted from the second ranging signal, or (ii) adjusting the information extracted from the second ranging signal and determining the estimated position using the adjusted information extracted from the second ranging signal; and based on determining that the first measure exceeds the second measure by a first amount and the second path distance is less than the first path distance, (i) determining the estimated position using the information extracted from the second ranging signal and without using the information extracted from the first ranging signal, or (ii) adjusting the information extracted from the first ranging signal and determining the estimated position using the adjusted information extracted from the first ranging signal.

14. The non-transitory machine-readable medium of claim 13, wherein the method comprises:
   determining a weight based on the one or more relationships; and
   using the weight to determine the estimated position.

15. The non-transitory machine-readable medium of claim 13, wherein the method comprises:
   determining a time bias based on the one or more relationships; and
   using the time bias to determine the estimated position.

16. A non-transitory machine-readable medium embodying program instructions adapted to be executed to implement a method for estimating a position of receiver, the method comprising:
   extracting information from a first ranging signal received from a first transmitter;
   extracting information from a second ranging signal received from a second transmitter, wherein the first ranging signal and the second ranging signal were concurrently transmitted;
   determining a first location of the first transmitter;
   determining a second location of the second transmitter, wherein the first location and the second location are separated by no more than 100 meters;
   determining an estimated position of the receiver based on one or more relationships between the information extracted from the first and second ranging signals and information corresponding to the first and second locations;
   determining a first line-of-sight distance between an initial estimate of the receiver's position and the first location of the first transmitter;
   determining a second line-of-sight distance between the initial estimate of the receiver's position and the second location of the second transmitter;
   determining a first path distance between the receiver and the first location of the first transmitter, wherein the first path distance corresponds to a first distance travel by the first ranging signal;
   determining a second path distance between the receiver and the second location of the second transmitter, wherein the second path distance corresponds to a second distance travel by the second ranging signal;
   determining said estimated position of the receiver using the first line-of-sight distance, the second line-of-sight distance, the first path distance, and the second path distance;
   determining a first measure of difference between the first and second path distances;
   determining a second measure of difference between the first and second line-of-sight distances;
   determining if the first measure exceeds the second measure by a first amount;
   based on determining that the first measure exceeds the second measure by the first amount and the first ranging signal arrived at the receiver before the second ranging signal arrived at the receiver, (i) determining the estimated position using the information extracted from the first ranging signal and without using the information extracted from the second ranging signal, or (ii) adjusting the information extracted from the second ranging signal and determining the estimated position using the adjusted information extracted from the second ranging signal; and
   based on determining that the first measure exceeds the second measure by the first amount and the second ranging signal arrived at the receiver before the first ranging signal arrived at the receiver, (i) determining the estimated position using the information extracted from the second ranging signal and without using the information extracted from the first ranging signal, or (ii) adjusting the information extracted from the first ranging signal and determining the estimated position using the adjusted information extracted from the first ranging signal.

17. The non-transitory machine-readable medium of claim 16, wherein the method comprises:
   determining a weight based on the one or more relationships; and
   using the weight to determine the estimated position.

18. The non-transitory machine-readable medium of claim 16, wherein the method comprises:
   determining a time bias based on the one or more relationships; and
   using the time bias to determine the estimated position.

* * * * *